March 9, 1948. H. R. LEGATSKI 2,437,394
CATALYTIC PROCESS FOR THE ISOMERIZATION OF HYDROCARBON
VAPORS IN THE PRESENCE OF A METAL HALIDE CATALYST
Filed Aug. 11, 1945
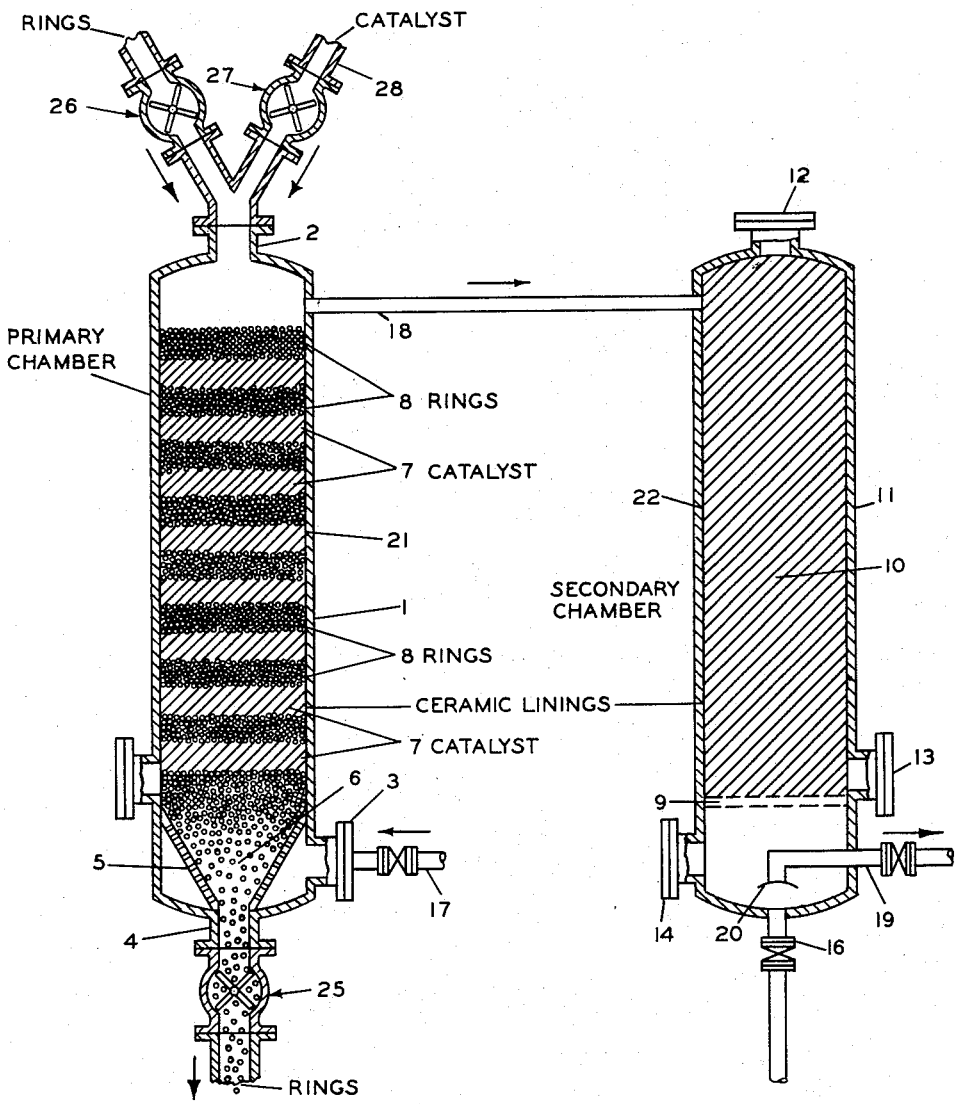
*INVENTOR.*
H. R. LEGATSKI
BY Hudson & Young
ATTORNEYS Patented Mar. 9, 1948

2,437,394

UNITED STATES PATENT OFFICE 2,437,394

CATALYTIC PROCESS FOR THE ISOMERIZATION OF HYDROCARBON VAPORS IN THE PRESENCE OF A METAL-HALIDE CATALYST

Harold R. Legatski, Bartlesville, Okla., assignor to Phillips Petroleum Company, a corporation of Delaware Application August 11, 1945, Serial No. 610,339

4 Claims. (Cl. 260—683.5)

This invention relates to catalytic operations using metal halide catalysts. In one of its more specific aspects it relates to a continuous method for operating a catalytic process using metal halide catalysts wherein fusing or coking and ultimate solidification of the catalyst does not occur.

This application is a continuation-in-part of my application filed October 5, 1942, Serial No. 460,857.

In present day processes many operating difficulties are encountered when using such volatile and soluble catalysts as certain metal halides, as for example, aluminum chloride. When reaction vessels are charged with large quantities of this catalyst, the flow of reactant materials therethrough is frequently rapidly decreased with the passage of time. The maintenance of a constant volumetric flow is effected only at the expense of markedly increased pressures and a corresponding pressure drop through the catalyst chambers becomes evident. Aluminum chloride sludge forms and is usually sufficiently fluid to flow downward over the catalyst tending to "coke" or "fuse" the catalyst in place. When this condition occurs and in combination with removal of some of the catalyst by vaporization, the combined action results in the formation of channels, and as is well known, channeling seriously impedes efficient operation.

Catalytic operations are frequently carried out at somewhat elevated temperatures and in case aluminum chloride or other metal halide is used at elevated temperatures the above mentioned difficulties may be considerably increased. For example, an isomerization catalyst chamber containing an aluminum chloride catalyst which must be maintained at a uniform temperature of say, 220° F., for reaction to proceed at the optimum rate, will usually within a relatively short interval of time experience difficulty due to sludge clogging the catalyst supporting screens or grids, catalyst particles fusing together to form a "bridge" and trays corroding, with the result that reactant vapors channel through the catalyst bed reducing reaction rates, and excessive pressure drop will be required for passage.

An object of this invention is to provide a metal halide catalyst chamber so constructed that the vaporization of the said metal halide catalyst, such as aluminum chloride, and the formation of the reaction sludge will not permit channeling to take place.

Another object of this invention is to provide a catalyst chamber for use with aluminum chloride catalyst, so constructed and charged with the catalyst that coking or fusing of catalyst with resultant "bridging" will not occur.

Still another object of this invention is to provide a catalyst chamber for use with aluminum chloride as catalyst, so constructed and so charged with catalyst and operated that the bed remains continually open and free to the flow of reactant materials thereby preventing the building of excessive pressures and pressure drops.

These and related objects and advantages may be realized by one skilled in the art by use of my invention as set forth and fully described in the following detailed disclosure.

The drawing represents in diagrammatic form one design, construction and method of charging with catalyst, my catalyst chamber.

Referring now to the drawing, numeral 1 represents the steel shell of a catalyst chamber or tower provided with openings 2, 3 and 4. A conical shaped bed plate or grid 5 is so placed in tower 1 that any material resting against the plate may be easily removed through opening 4. For convenience in this removal of material said grid 5 is of conical construction, the downward slope pointing toward the opening 4. It is perforated or slotted to permit the free flow of reactant materials but, of course, the openings are sufficiently small as not to permit passage of solid catalyst or the Raschig type rings to be described hereinafter.

One type of conventional catalyst chamber which is relatively long in proportion to its diameter, is packed with catalyst extending from the bed plate or grid near the bottom of the chamber to a point near the top thereof. Sufficient overhead settling space or volume is usually provided to prevent the carrying out of fine catalyst. Another type of catalyst packing comprises two or three individual beds of catalyst, one above the other and each supported on its own bed plate or grid. Above each catalyst mass is a small space intermediate the top of said catalyst mass and the next higher bed plate. This relatively small volume or space assists in the prevention of channeling and assists materially in promoting contact between reactants and catalyst. Yet in this improved catalyst tower serious difficulties are encountered when the catalyst is aluminum chloride, because of its tendency to vaporize and to form a fluid sludge, the former removing catalyst from the reaction zone, and the latter (sludge) flowing downward over the remaining catalyst particles causing them to become cemented together, thereby preventing free flow of reactant materials. I have found that by packing a tower of essentially conventional exterior design in a special manner that the above mentioned disadvantages and objections are overcome and a tower so packed may be used for relatively long periods of time in continuous operation.

My method of packing a primary tower with such a catalyst as aluminum chloride, comprises placing upon the sloping grid 5 in chamber 1 a granular and inert material, such as Raschig rings of small diameter. The exact quantity or rather the depth or thickness of this layer of rings is not critical but should be of the order of say 1 to 1½ feet. This bottom layer may preferably be somewhat larger than the layers to be added at higher levels in the chamber on account of the slope of the grid 5. This lower layer of packing material is represented by the rings identified by numeral 6. This layer of packing is sufficiently strong to hold or support a heavy load from above.

Upon this lower layer of supporting material 6 is placed a layer of catalyst 7. This layer of catalyst is not separated from the supporting material 6 in any way but is in direct contact therewith. Upon this lower bed or layer of catalyst is placed a layer of Raschig rings or other supporting material 8, similar to that comprising the bottom layer 6. In a similar manner, alternate layers of catalyst 7 and packing material 8 are added to the vessel until sufficient catalyst or charge has been added.

The exact thickness of the layers of the packing material and of the catalyst is not critical since they may be varied within limits which are different for each packing material, its size or state of subdivision, and for each catalyst.

I have found that when aluminum chloride is used as an isomerization or alkylation catalyst in petroleum oil refining operations that the catalyst grains may well be of size ranging from say ⅛ inch to 2 or 2½ inches in diameter. For catalyst particles of this size range, the thickness of the individual beds or layers 7, may vary from say 6 inches to 2 feet or more, and this thickness is somewhat dependent upon the diameter of the containing vessel, the greater the diameter, the thicker may be the catalyst layers and yet not permit coking or channeling to occur.

Similarly, the thickness of the layers of Raschig rings or other packing material is not critical and may be varied somewhat dependent upon local conditions. I have found when layers of catalyst of the approximate size as mentioned above and 1" x 1" Raschig rings are used, that these layers may be of approximately equal thickness, and the exact layer thickness is not a critical factor. However, in the above mentioned operations, layer thickness ranging from about 6 inches to approximately 2 feet have been found to give satisfactory results. The number of layers of rings and of catalyst will be immaterial as long as the total amount of catalyst used is sufficient to give the desired contact or reaction time.

Since such metal halide catalysts are appreciably volatile in hydrocarbon vapors and somewhat soluble in liquid hydrocarbons, catalyst material will be dissolved or vaporized and carried from the primary catalyst tower 1. Since these vapors or materials in solution are corrosive to equipment used in subsequent process steps, it is desirable to remove or extract as much of said corrosive material from the stream as possible. For this purpose I have provided a secondary chamber. This chamber or vessel is provided with a bed plate or grid 9 sufficiently strong and rigid to support a column of inert packing material 10, such as the Raschig rings as mentioned hereinbefore. In this type of operation, wherein the catalyst such as aluminum chloride is volatile and may be carried out in vaporous effluent from the primary chamber, it was observed that much of the entrained and corrosive catalyst was precipitated on Raschig ring packing on passage through a secondary vessel containing this material as shown herein.

This secondary vessel may be of size equal to that of the primary chamber, but not necessarily so. The shell or exterior portion 11 of this vessel may be of conventional material, as steel, or other material which is able to withstand pressures encountered in such operations. This secondary vessel may best be fitted with manholes, as 12, 13 and 14, for cleaning and charging purposes. A bottom opening or drawoff line 16 is provided in the bottom for the removal of sludge or other material which may accumulate therein.

For removing the Raschig rings or other inert material which accumulates in the bottom of the primary chamber an opening 4 is provided. To this opening 4, which may well be a flanged opening, is attached a star or rotary valve mechanism 25 which is adapted to transfer solid material and yet maintain a gas tight seal. Any other valve or solid material removal mechanism may be used in place of this star valve providing it be suitable for the double purpose of removing solid material and maintaining a gas tight seal at the same time.

This star rotary or other valve 25 is operated by an electric motor or other source of power, not shown, either intermittently or continuously as required. In most cases the Raschig rings 6 accumulate rather slowly in the base portion of reactor vessel 1 so that a gear reduction down to a very slow speed should preferably be used. I have found, however, even with a gear reduction that the valve 25 need be operated only at intervals and then for only short periods of time.

In like manner, another star rotary valve 26 is installed at the top of the reactor vessel 1 for the purpose of adding Raschig rings to the vessel when necessary. Similarly still another rotary valve 27 is inserted in a catalyst feed line 28 for addition of new catalyst to the reactor as required. The valves 26 and 27 may be powered by any source of power as desired.

In the drawing the inlet line 17 to the primary chamber is shown at the bottom indicating that flow of reactant material is upward in the tower, exiting through top line 18 and passing therethrough into the top of the secondary chamber. Materials of reaction then pass downward in this secondary tower and leave the same by line 19. In operation, it was found that some sludgy material and/or condensed catalyst or other solid and/or liquid material filtered through the packing 10 in the secondary chamber and upon passage through the outflow line 19 cause corrosion of equipment in subsequent operations. To overcome this corrosion I have found by attaching a bell-shaped or spherical segment member 20 on the inner end of line 19 and within the bottom settling chamber that this carry out tendency is greatly reduced, and the efficiency of the operation is reflected in the rather marked decrease in corrosion in subsequent equipment.

The accumulated corrosive material is periodically removed by operation of the valve in said drawoff line 16.

Another point of novelty in my apparatus is the lining which I use for the primary and secondary chambers, and preferably use as a covering for all exposed metal parts. Linings 21 and 22 of the primary and secondary chambers, respectively, comprise a ceramic material which is resistant to the action of acids such as are present in processes using such catalysts as the metal halides. This ceramic material may be selected from that commercially available, and may be an enamel or glass type material manufactured directly onto the steel walls or may be a brick type material installed after the steel chambers are set in place.

In the operation according to my improved catalyst chamber and packing therefor, reactant materials in liquid or vaporous phase are introduced into the bottom of the primary chamber through line 17. Upon passage upward through the chamber the catalyst, such as aluminum chloride, becomes active and promotes the desired reactions, as in isomerization, alkylation or other processes. These reactions are frequently or usually carried out at somewhat elevated temperatures. At these above atmospheric temperatures, some aluminum chloride is vaporized and is carried from the chamber with the effluent materials through line 18. In addition, some aluminum chloride is converted into a fluid sludge which tends to flow downward in the chamber and over the remaining aluminum chloride. In so doing, some of this sludge precipitates out and in conventional catalyst towers causes the cementing or fusing of the granules of catalyst, thereby causing channeling and building up a marked resistance to fluid flow. In my catalyst chamber the aluminum chloride sludge tends to deposit itself upon the surfaces of the Raschig rings, such deposits tending to prevent the above mentioned cementing or fusing of the catalyst particles, hence channeling is largely overcome. In addition, when the aluminum chloride sludge is deposited on the Raschig ring surfaces this deposit actually increases the area of catalyst surface available for promotion of the desired reactions.

Another advantage of my process is that as the catalyst is consumed in the primary tower and removed therefrom, the remaining bed of catalyst and Raschig settles downward therein so that additional layers of rings and catalyst may be added through the top opening 2. Each downward movement of the charge of rings and catalyst in said tower assists in "breaking up" any catalyst and/or Raschig rings which might have previously been coked. This continual downward catalyst movement exerts a marked overall beneficial effect toward maintaining the catalyst bed in an open condition permitting the free flow of reactant materials.

As catalyst is removed from the lower portion of the primary chamber the Raschig rings will accumulate at this point. Opening 4 and rotary valve 25 are for removing the accumulated Raschig rings, which may then be added along with new catalyst to the top of this chamber by means of rotary valves 26 and 27 through opening 2.

The overall operation of my process comprises mainly continuous passage of reactant hydrocarbons through the primary chamber from bottom to top, continuous removal of rings or other inert material accumulating in the base of the vessel, and alternate or concurrent addition of rings or other inert material and catalyst into the top of the reaction vessel. As mentioned hereinbefore, when aluminum chloride catalyst is used, since it is somewhat volatile in hot hydrocarbons, it is continuously though slowly removed from the base of the reaction vessel by the stream of reactant hydrocarbons; thus there accumulates at this point substantially only the rings or such inert material as was added by rotary valve 26.

Also, as mentioned hereinbefore, the rings and the catalyst may be added to the top of the reaction vessel as separate layers as illustrated in the drawing or may be added simultaneously in any ratio as desired, for example, 1 part rings to 1 part catalyst, or 2 parts rings to 1 part catalyst. Likewise, the particular depth or thickness of the individual layers of material may be determined by the operator or engineer as best suited for the particular problem at hand.

In this disclosure as hereinbefore given, I do not wish to be limited by the specific example given since it was intended only to be illustrative of a general principle. Many factors may be varied, for example, the relative and absolute dimensions of the chambers, the number and thickness of the catalyst and Raschig ring layers, and many other details, such as, the inert packing material need not be Raschig rings made of ceramic material, but may be broken material or other inert material of proper size as might be conveniently available, and yet remain within the intended spirit and scope of my invention.

Aluminum chloride was disclosed as the catalyst used in my improved catalyst chamber, but it should be known that other metal halide catalysts, such as aluminum bromide, ferric chloride, ferric bromide or other catalysts which tend to vaporize and to form sludge and become coked or fused in place and cause channeling to occur, may be used.

I claim:

1. In a continuous catalytic process for the isomerization of hydrocarbon vapors in the presence of a metal halide catalyst the method which comprises passing the hydrocarbon vapors to be isomerized into the bottom end of a catalyst zone charged with alternate layers of metal halide catalyst and granular inert members, said catalyst zone having a bottom inlet end and a top outlet end with respect to hydrocarbon flow, maintaining said catalyst zone under isomerizing conditions, removing hydrocarbon vapors and vaporous metal halide catalyst from the outlet end of said catalyst zone, and continuously adding alternate layers of metal halide catalyst and granular inert members to the outlet end, and removing said granular inert members from the inlet end of said catalyst zone.

2. The method of claim 1 wherein the metal halide catalyst is aluminum chloride and the granular inert members are Raschig rings.

3. In a continuous catalytic process for the isomerization of hydrocarbon vapors in the presence of a metal halide catalyst the method which comprises passing the hydrocarbon vapors to be isomerized into the bottom end of a catalyst zone charged with alternate layers of metal halide catalyst and granular inert members, said catalyst zone having a bottom inlet end and a top outlet end with respect to hydrocarbon flow, maintaining said catalyst zone under isomerizing conditions, continuously adding alternate layers of metal halide catalyst and granular inert members to the outlet end, and removing said granular inert members from the inlet end of said catalyst zone; removing vapors containing isomerized hydrocarbons and metal halide catalyst from the outlet end of said catalyst zone and passing said vaporous material into one end of a precipitation zone containing granular inert members and removing hydrocarbon vapors containing isomerized hydrocarbons and substantially free from said metal halide catalyst from the other end of said precipitation zone.

4. The method of claim 3 wherein the metal halide catalyst is aluminum chloride and the granular inert material is Raschig rings.

HAROLD R. LEGATSKI.

REFERENCES CITED

The following references are of record in the file of this patent:

UNITED STATES PATENTS

| Number | Name | Date |
|---|---|---|
| 2,248,734 | Barr | July 8, 1941 |
| 2,312,006 | Thiele | Feb. 23, 1943 |
| 2,324,746 | Weinrich et al. | July 20, 1943 |
| 2,351,354 | McMillan | June 13, 1944 |
| 2,364,106 | Solomon et al. | Dec. 5, 1944 |

OTHER REFERENCES

Chemical Engineering Catalog, 1935, pp. 486, 487.